Nov. 3, 1925.
W. F. PITTMAN
FERTILIZER DISTRIBUTOR
Filed July 10, 1924
1,560,313
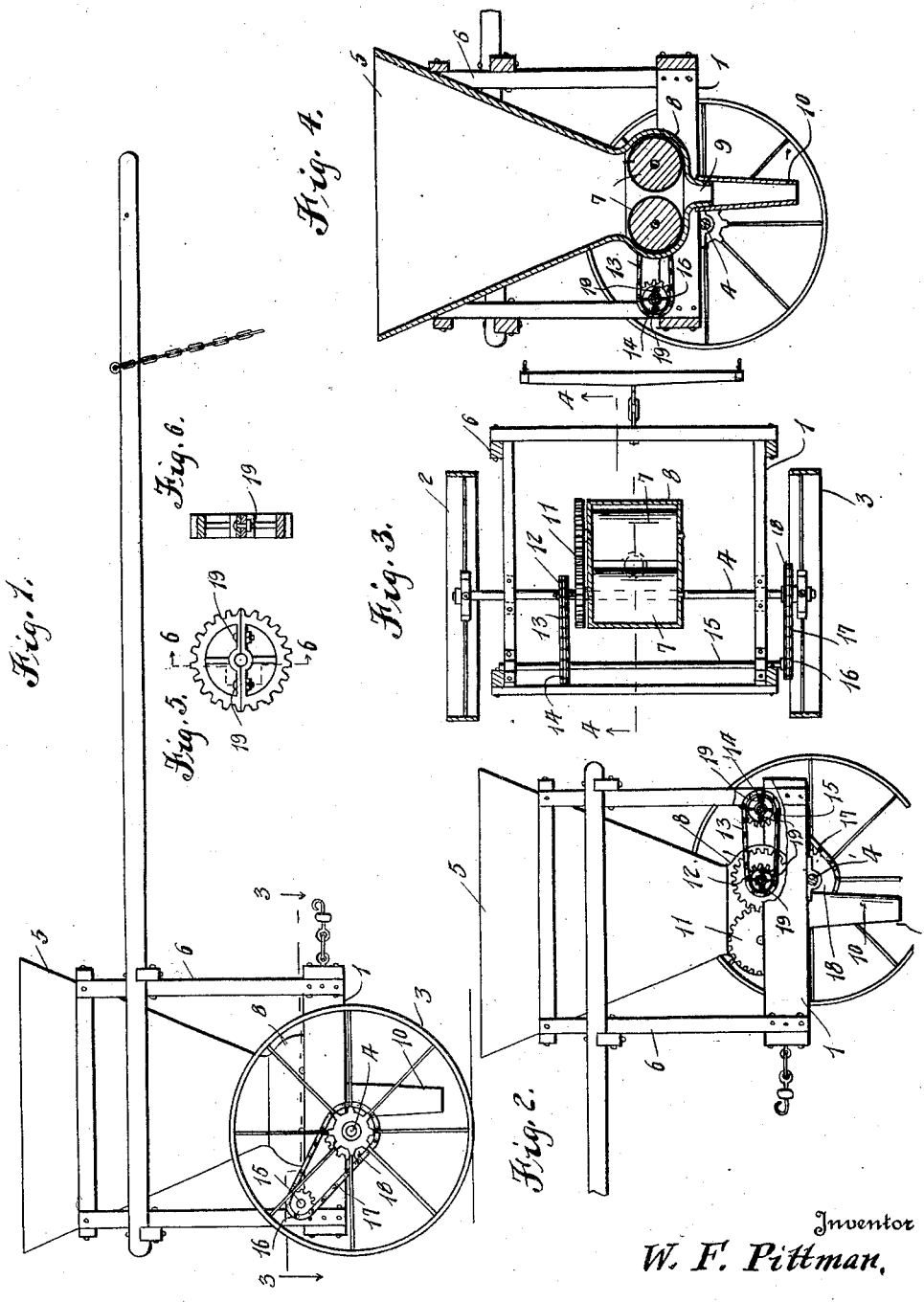
Inventor
W. F. Pittman,
By
Attorney Patented Nov. 3, 1925.

1,560,313

UNITED STATES PATENT OFFICE.

WALTER F. PITTMAN, OF KENLY, NORTH CAROLINA.

FERTILIZER DISTRIBUTOR.

Application filed July 10, 1924. Serial No. 725,206.

*To all whom it may concern:*

Be it known that I, WALTER F. PITTMAN, a citizen of the United States, residing at Kenly, in the county of Johnston and State of North Carolina, have invented certain new and useful Improvements in Fertilizer Distributors; and I do hereby declare the following to be a full, clear, and exact description of the invention, such as will enable others skilled in the art to which it appertains to make and use the same.

The present invention relates to agricultural implements and more particularly to machines of the type for distributing fertilizer when preparing the soil preliminary to planting.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a side view of a fertilizer distributor embodying the invention,

Figure 2 is a similar view of the machine as seen from the reverse side,

Figure 3 is a horizontal section on the line 3—3 of Figure 1,

Figure 4 is a vertical longitudinal section on the line 4—4 of Figure 3,

Figure 5 is a side view of an interchangeable sprocket wheel, and

Figure 6 is a sectional view on the line 6—6 of Figure 5.

Corresponding and like parts are referred to in the following description and designated in the several views of the drawings by like reference characters.

The machine comprises a suitable frame 1 mounted upon wheels 2 and 3 carried by an axle 4 which is journaled in bearings attached to the frame 1. A hopper 5 fitted to a frame 6 attached to and disposed above the frame 1 is adapted to receive the fertilizer to be distributed. A pair of rolls 7 is located within the bottom of the hopper 5 and are adapted to be reversely driven so that the adjacent surfaces travel downwardly and carry the fertilizer between them with the result that a positive feed is assured and any lumps are crushed and broken up. Opposite portions of the hopper in line with the rolls 7 are outwardly curved or bulged as indicated at 8 to fit close about the rolls to prevent any of the fertilizer collecting between the outer sides of the rolls and the adjacent portions 8 of the hopper. By this construction it will be apparent that the material in the hopper will be retained therein by the unhoused portions of said rolls 7. A nozzle 9 constitutes an outlet and is disposed below the rolls 7 and in line with the space formed between them. A tube or spout 10 is fitted to the nozzle 9 and serves to direct the fertilizer to the ground and prevent scattering thereof by the wind. Gear wheels 11 connect the journals of the rolls at one end and one of the journals is extended and receives a sprocket wheel 12 which is connected by means of a sprocket chain 13 to a sprocket wheel 14 secured to a transverse shaft 15. A sprocket wheel 16 fast to the shaft 15 is connected by means of a sprocket chain 17 to a sprocket wheel 18 fast to the axle 4 of the wheel 3 and in this manner the rolls 7 are positively rotated when the implement is drawn over the field.

In order to vary the speed of the rolls 7 the sprocket wheels 12 and 14 are adapted to be replaced by other sprocket wheels of different diameters. This admits of varying the amount of fertilizer to be distributed. These sprocket wheels are of sectional formation as shown most clearly in Figures 5 and 6, the sections when assembled being secured by bolts 19. The substitution of different sized sprocket wheels may be easily and quickly effected. The bolts 19 secure the sections of the sprocket wheels and clamp them to the respective shafts so as to rotate therewith.

What is claimed is:—

A hopper having outward bulges in the side walls above the discharge spout, contiguous feed rollers journaled adjacent the bulges to be approximately one-half housed in said bulges, the remaining or unhoused portions of said rollers constituting the bottom of said hopper and supporting the material therein.

In testimony whereof I affix my signature.

WALTER F. PITTMAN.